US012559345B2

(12) United States Patent
Nikovski et al.

(10) Patent No.: US 12,559,345 B2
(45) Date of Patent: Feb. 24, 2026

(54) MULTI-INPUT CALL PANEL FOR AN ELEVATOR SYSTEM

(71) Applicant: Mitsubishi Electric Research Laboratories, Inc., Cambridge, MA (US)

(72) Inventors: Daniel Nikovski, Brookline, MA (US); William Yerazunis, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1246 days.

(21) Appl. No.: 17/387,446

(22) Filed: Jul. 28, 2021

(65) Prior Publication Data

US 2022/0324676 A1 Oct. 13, 2022

Related U.S. Application Data

(60) Provisional application No. 63/172,780, filed on Apr. 9, 2021.

(51) Int. Cl.
*B66B 1/46* (2006.01)
*B66B 1/28* (2006.01)
(Continued)

(52) U.S. Cl.
CPC ............ *B66B 1/468* (2013.01); *B66B 1/3407* (2013.01); *B66B 1/52* (2013.01); *B66B 1/28* (2013.01);
(Continued)

(58) Field of Classification Search
CPC ......... B66B 1/468; B66B 1/3407; B66B 1/52; B66B 1/28; B66B 2201/4623; B66B 2201/463; B66B 2201/4638
(Continued)

(56) References Cited

U.S. PATENT DOCUMENTS 5,780,789 A * 7/1998 Tsuji .................... B66B 1/2458 187/382
6,902,041 B2 * 6/2005 Eccleston ............... B66B 1/463 187/901
(Continued)

FOREIGN PATENT DOCUMENTS

JP 2015151253 A * 8/2015
JP 2019142686 A * 8/2019
WO WO-2021237348 A1 * 12/2021 ............ G06F 3/044

*Primary Examiner* — Christina M Schreiber
(74) *Attorney, Agent, or Firm* — Gene Vinokur

(57) ABSTRACT

A multi-input call panel for controlling an operation of an elevator system, is disclosed. The multi-input call panel includes a touchable interface associated with a plurality of touchable inputs arranged at different locations on the multi-input call panel; a touchless interface including a processor configured to receive readings of a sensor detecting motion in proximity to the touchable interface and executing a probabilistic classifier trained to output a probability of correspondence of the received readings with an intention to touch one or multiple touchable inputs from the plurality of touchable inputs; and a controller configured to control the operation of the elevator system according to a control command associated with a touchable input of the plurality of touchable inputs when the touchable input is touched on the touchable interface, the classifier outputs the probability of the intention to touch the touchable input above a threshold or both.

20 Claims, 13 Drawing Sheets

(51) Int. Cl.
*B66B 1/34* (2006.01)
*B66B 1/52* (2006.01)

(52) U.S. Cl.
CPC . *B66B 2201/4623* (2013.01); *B66B 2201/463* (2013.01); *B66B 2201/4638* (2013.01)

(58) Field of Classification Search
USPC .......................................................... 187/380
See application file for complete search history.

(56) References Cited

U.S. PATENT DOCUMENTS 10,968,073 B1 * 4/2021 Alnajjar ............. G08B 21/0476
11,221,680 B1 * 1/2022 Clements ................ G06F 3/017
11,594,089 B2 * 2/2023 Hogg ................. G07C 9/00174
2015/0368067 A1 * 12/2015 Tang ........................ H04B 5/70
187/380
2018/0354746 A1 * 12/2018 Blanchard ............. B66B 1/2408
2019/0375609 A1 * 12/2019 Hosokawa ............ B66B 1/3453
2020/0331724 A1 * 10/2020 Stuppi ................... B66B 13/143
2021/0339399 A1 * 11/2021 Schluntz .............. G05D 1/0088
2021/0371234 A1 * 12/2021 Nikovski ................ B66B 1/468
2022/0048733 A1 * 2/2022 Sahinoglu ............... B66B 3/002
2022/0106159 A1 * 4/2022 Yerazunis ............ H03K 17/941
2022/0324676 A1 * 10/2022 Nikovski .............. B66B 1/3407
2023/0192441 A1 * 6/2023 Wong ...................... B66B 3/002
187/380
2024/0051790 A1 * 2/2024 Bhor ....................... B66B 1/461
2024/0150153 A1 * 5/2024 Kusserow ............... B66B 1/468

* cited by examiner

700

702

704

| X,Y COORDINATES | BUTTON MAPPING |
|---|---|
| $(x_1,y_1)$ | $b_1$ |
| $(x_1,y_2)$ | $b_2$ |
| $(x_1,y_3)$ | $b_3$ |
| ... | ... |

Figure 7

MULTI-INPUT CALL PANEL FOR AN ELEVATOR SYSTEM

TECHNICAL FIELD

The present disclosure generally relates to vertical transport technology, and more specifically to a multi-input call panel for controlling an operation of an elevator system.

BACKGROUND

Various types of equipment such as an elevator, a factory automation machine, an information kiosk, or the like are operated by means of a control panel. The control panel may include physical buttons arranged on the control panel or virtual buttons displayed on a touchscreen of the control panel. For reasons of hygiene and limiting spread of contagious diseases, it may be desirable to operate such button panels in a touchless manner. To that end, the elevator may be operated in the touchless manner using multiple sensors, such as thermal sensors, e.g., infrared (IR) sensors, motion sensors, light sensors, etc. The sensors may detect touchless inputs of a user for operating the elevator. However, touchless implementation for controlling the elevator may require full replacement of the existing button-based control panel, which may be expensive and inefficient. In some cases, the control panel may be customized by means of application programming. However, the customization of the control panel may consume time and manual effort. For instance, a skilled expert or a technically sound expert may be required to implement the application programming for the customization, which may also become expensive for rapid deployment.

Accordingly, there is a need for a technical solution for controlling an operation of an elevator system or other equipment in an efficient and feasible manner.

SUMMARY

It is an objective of the present disclosure to provide a contactless interface for retrofitting an existing contact-based control panel, such as button panel of the elevator system. To that end, the contactless interface (interchangeably referred to hereinafter as touchless interface) may use any sensor for detecting a contactless input or a touchless input of a user. The touchless input may be detected by the sensor when a user input, such as a finger of the user crosses a horizontal plane in space that is in front of the button panel and approximately parallel to the button panel at a specified distance. After the detection, the sensor starts to record corresponding readings. When the readings are recorded, a correspondence between the readings of the sensor and one or multiple buttons in the button panel intended to be pressed, is established. The correspondence may be established from a minimal set of demonstration performed at installation of the contactless interface. The set of demonstration may include data points manually inputted by an installer of the contactless interface. For instance, the set of demonstration may include instructions for regular operation of the button panel. The regular operation may correspond to pressing each button at appropriate times, while simultaneously detecting and recording these button presses in a database. After the correspondence has been established, the correspondence may be stored in a computing device for regular use in a touchless operation mode.

During the touchless operation mode, the computing device constantly monitors the readings of the sensor, and computes, for each button on the button panel, the probability that a user intends to press that button. When one of the probabilities exceeds a threshold, a button press is registered on behalf of the user, without the user having to physically touch the button.

In some cases, intentions of the user to press one or more buttons on the button panel may be ambiguous. For instance, the user's finger may be between two buttons. Accordingly, it is also an objective of some embodiments to recognize intentions of the user to press the one or more buttons. To that end, evidence about the intentions of the user may be collected and accumulated in the computing device based on the readings of the sensor. The evidence of the intentions may be accumulated, until a probability of the intention exceeds the threshold, and a button press is registered.

Accordingly, it is an objective of some embodiments to provide a multi-input call panel for controlling an operation of an elevator system. In various embodiments, the multi-input call panel is configured for receiving inputs, such as call commands from two types of input interfaces. The two types of input interfaces include a touchable interface (i.e., the button panel) and a touchless interface (i.e., the contactless interface). The touchable interface is associated with a plurality of touchable inputs (e.g. buttons) arranged at different locations on the touchable interface. Each touchable input of the plurality of touchable inputs corresponds to a predefined destination, such as a floor of a building. For instance, a button with a label '5' corresponds to fifth floor of the building. The touchable input triggers a command to control motion of the elevator to the destination floor upon being touched or pressed by a user and/or operator of the elevator. Some of the non-limiting examples of the touchable interface include a button panel in which each button acts as a touchable input responsive to a touch input, such as pressing by a finger of the operator. Some other examples of the touchable interface may include a keyboard-based control panel, a keypad-based control panel, or the like. The touchless interface may include a touch-sensitive screen where different parts of the screen may correspond to different destination floors. Further, the touchless interface may be operatively connected to a sensor that senses space in proximity to the multi-input call panel. The touchless interface may be configured to transform readings of the sensor into commands for controlling the operation of the elevator.

Some embodiments are based on a realization that such multi-input call panel provides a synergy in using one and/or a combination of the touchable and touchless input interfaces. Further, the multi-input call panel may enable retrofitting existing button panel used for operating elevators. In addition, the synergy provides a joint usage of the touchable and touchless interfaces. The joint usage enables configuring, training and utilizing the touchless interface to use guidance provided by the touchable interface. For example, the readings of the sensor in the proximity of the call panel may be interpreted with respect to locations of various touchable inputs such as buttons. In such a manner, the intentions of the user to press a specific button may be transformed into a control command associated with corresponding button before the user touches that button. To that end, the usage of the touchable and touchless interfaces is synchronized and the touchless interface may become intuitive for users of the elevator. In this manner, the multi-input call panel may be operated in a touchable manner that the users are accustomed to or in a touchless manner when desired by the users. For instance, at time of pandemic situation, the users may prefer to operate the elevator using the touchless interface for hygiene and safety reasons.

Some embodiments are based on a further realization that to achieve the synergy in the operation of the multi-input call panel, functions of the touchless interface may be trained in a specific manner imitating actual touching on the touchable interface. To that end, it is another objective of some embodiments to provide a trained probabilistic classifier that maps the readings of the sensor to intention of the user to touch a specific touchable input.

In some cases, the touchable inputs may be densely arranged on the multi-input call panel. For instance, buttons of the touchable interface may be closely spaced to each other. Such dense arrangement of the touchable inputs may affect multiple paths or gestures that the user may choose to press specific touchable inputs on the multi-input call panel. To that end, some embodiments are based on the understanding that during the training of the classifier, the actual intention of the operator to press a specific button is ambiguous until the operator actually touches the button.

In some embodiments, the training may be performed in response to a touch on a button of the touchable interface. For instance, a reading of the sensor at the moment of touching and/or preceding the touching may be associated with the touched button upon detection of the touch on that button. In such a manner, when different buttons are touched, the reading of the sensor may be labeled with an identity of different buttons for ground truth information used during a training of the classifier. The training of the classifier may allow to unambiguously label the readings of the sensor with the intention indicated by the actual pressing. The training of the classifier may also allow associating with the button, not only location of the readings and also number of the reading in proximity to the multi-input call panel. In such manner, accidental readings of the sensor can be prevented. For example, when a shoulder of the user is within a field of view of the sensor, the classifier detects the intention of the user before the user physically touches a button on the multi-input call panel.

In some embodiments, the probabilistic classifier may be trained to detect the intention of the user to touch a touchable input, i.e., a button when a probability of such touching is above a threshold. In some example embodiments, the probabilistic classifier may be trained in consideration of noise of the readings of the sensor. In combination, the probabilistic classifier and the threshold for detecting the intention may be trained in an end-to-end manner to so as to achieve balance between declaring the intentions too soon or too late.

Some embodiments are based on another recognition that different control panels may have differences in type, structure, and installation. To that end, the probabilistic classifier may be trained on-site. For instance, the probabilistic classifier may be trained when the multi-input call panel is installed to control the elevator system. In the on-site training, the probabilistic classifier is trained in response to touching a touchable input. Such on-site training may be performed by an installer without additional measurements or instrumentality during the installation and/or maintenance of the multi-input call panel.

To that end, in some embodiments, the multi-input call panel may be configured to have two modes of operation. The two modes of operation may include a training mode and a control mode. During the training mode, touch inputs on buttons of the touchable interface, and readings of the sensor preceding the touch inputs are collected. The probabilistic classifier is trained based on the collected touch inputs and the readings of the sensor. In various implementations, such touch inputs do not invoke changing the operation of the elevator system. During the control mode, the touch inputs and outputs of the probabilistic classifier are used to control the operation of the elevator system. Such training offers flexibility to retrofit the touchless interface with different kinds of touchable interfaces.

Additionally or alternatively, some embodiments are based on the realization that the probabilistic classifier may be trained in advance for specific types of touchable interfaces and during the training mode being calibrated for the specificity of installation. During the training mode of the multi-input call panel, the installer may touch same buttons to create a transformation function. The transformation function transforms the readings received when the multi-input call panel is installed to the corresponding readings used during the training. During the control mode, the readings of the sensor are transformed by the transforming function before being submitted to the probabilistic classifier.

In different embodiments, the probabilistic classifier may be trained in different manners. For example, in one embodiment, the sensor may be arranged to sense a plane parallel to the multi-input call panel at some fixed distance, e.g., 20 mm. Hence, the readings of the sensor may record location of an input of the user, such as a location of a tip of the user's finger at the plane. The location may correspond to x,y coordinates in that plane. The x,y coordinates may be fed as input to the probabilistic classifier. The x,y coordinates may correspond to a class label of the button that the user eventually presses during the training. Such training may eliminate need for a technically skilled installer.

Additionally or alternatively, the probabilistic classifier may transform the readings collected, at the moment of touching (or preceding that touching), into the intention of the user to touch that button. In such a manner, x, y coordinates in the direction perpendicular to the multi-input call panel is considered along with different kinds of readings including time-series readings leading to the touching. In this manner, the probabilistic classifier becomes robust to different paths of different fingers of different users touching different buttons.

In some embodiments, the readings of the sensor may be represented in a coordinate frame that includes x,y spatial coordinates. In some embodiments, the readings of the sensor may correspond to a curved path taken by user's fingertip to press a button on the button panel. Such curved path may correspond to a trajectory that may also be represented in the coordinate frame. In the readings, a point corresponding to an input of the user may be closest to the plane of the button panel. The point of the user's tip that is closest to the plane may correspond with the smallest z coordinate (z=0 being the plane of the touch buttons).

For instance, if the point p=(x, y, z) are spatial coordinates of the point p, the corresponding x, y, and z coordinates may be fed as input to the probabilistic classifier. The probabilistic classifier may generate a crisp probability distribution for points where the user's intention is clear and unambiguous. The probabilistic classifier may also generate a less crisp distribution where there is ambiguity in the intention of pressing the button. For instance, there may be ambiguity when the user starts approaching the multi-input call panel from approximately same position for the buttons, before zeroing in on the intended one. To that end, the probabilistic classifier quantifies the ambiguity and registers a button press only when it is certain of the user intention to press the corresponding button. However, the probability classifier may require an enormous amount of training data to return the probability distribution. In some cases, the probabilistic classifier may be sensitive to data, such as height of the user. For instance, trajectories of fingertips of different users may depend largely on the height of the user. A user with shorter height may start moving in lower trajectory and a user with higher height may start moving in higher trajectory. To that end, some embodiments may use multiple planes in parallel to each other to execute the probabilistic classifier.

Additionally or alternatively, some embodiments may use relationship between different readings at different planes to extract readings of the sensor for the training and the control of the multi-input call panel. For example, a sequence of the XY locations of the finger (or centroids of the finger) in either Z planes (in case of multiple planes of the sensor) or at times T1, T2, T3 . . . Tn is detected and may be extrapolated to calculate a predicted "touch impact point" at the Z=0 plane of the buttons. This predicted touch impact point (PTIP) may be used in training the probabilistic classifier, detecting user pushbutton requests, or both.

In some other embodiments, points on a trajectory corresponding to the user's touch input may be given as input to the probabilistic classifier. To that end, x,y coordinates of the trajectory may be replaced with x,y coordinates of an intended touch on a button while retaining actual z value. This may allow the probabilistic classifier to distinguish imprecise guesses for large values of z from precise guesses for small values of z coordinate. To that end, the probabilistic classifier may return the crisp probability distributions for some values of z and ambiguous ones for larger values of z.

Additionally or alternatively, some embodiments disclose an adaptive correction of the location coordinates corresponding to touch inputs intending to press the buttons of the touchable interface.

Accordingly, one embodiment discloses a multi-input call panel for controlling an operation of an elevator system. The multi-input call panel includes a touchable interface associated with a plurality of touchable inputs arranged at different locations on the multi-input call panel. The multi-input call panel includes a touchless interface including a processor operatively connected to receive readings of a sensor arranged to sense motion in proximity to the touchable interface. The touchless interface is configured to, in response to receiving the readings, execute a probabilistic classifier trained to output a probability of correspondence of the received readings with an intention to touch one or multiple touchable inputs from the plurality of touchable inputs. The multi-input call panel further includes a controller configured to control the operation of the elevator system according to a control command associated with a touchable input of the plurality of touchable inputs when the touchable input is touched on the touchable interface, the classifier outputs the probability of the intention to touch the touchable input above a threshold or both.

Another embodiment discloses a method for controlling an operation of an elevator system using a multi-input call panel. The method includes receiving, via a touchless interface of the multi-input call panel, readings of a sensor of the touchless interface arranged to sense motion in proximity to a touchable interface of the multi-input call panel. The method includes executing, in response to receiving the readings, a probabilistic classifier trained to output a probability of correspondence of the received readings with an intention to touch one or multiple touchable inputs from a plurality of touchable inputs arranged at different locations on a touchable interface of the multi-input call panel. The method further includes controlling the operation of the elevator system according to a control command associated with a touchable input of the plurality of touchable inputs when the touchable input is touched on the touchable interface, the classifier outputs the probability of the intention to touch the touchable input above a threshold or both.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 7 illustrates a tabular representation depicting a mapping of touchless input intended to touch a button on the touchable interface of the multi-input call panel, according to one example embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
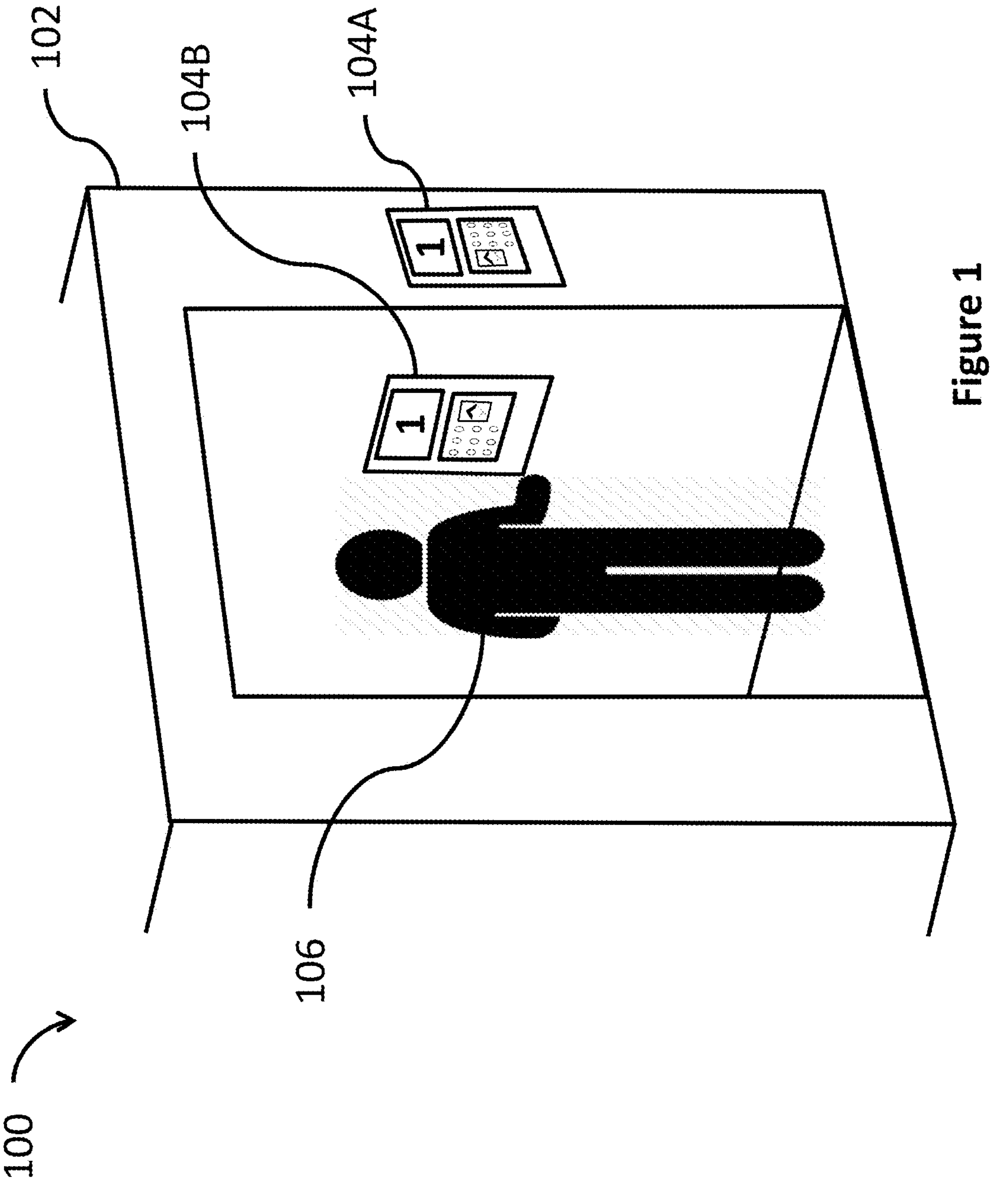
FIG. 1 shows an environment representation for controlling an operation of an elevator system, according to some embodiments of the present disclosure.

FIG. 1 shows an environment representation 100 for controlling an operation of an elevator system 102, according to some embodiments of the present disclosure. The environment representation 100 includes a user 106 at a service floor to access the elevator system 102 (interchangeably referred to hereinafter as the elevator 102) and move to the other service floor of a building (not shown in FIG. 1). The elevator 102 may be operated using a contact-based panel 104A implemented inside the elevator 102. For example, the contact-based input panel 104A may include buttons indicative of corresponding floors of the elevator 102 and other operational buttons of the elevator 102, such as open button to open door of the elevator 102, close button to close the door of the elevator 102, emergency call button, a lobby button, etc. The contact-based input panel 104A may also include a display screen to display an output indicative of corresponding service floor of the elevator 102. For instance, a particular service floor, such as first floor may be displayed as '1' on the display screen when the user 106 presses on corresponding button indicative of the first floor. The display screen also display an output indicative of an operation, when the user 106 may press on the corresponding operational button, such as the lobby button or the emergency call button on the contact-based input panel 104A. A similar contact-based panel 104B may be installed outside the elevator 102 for receiving inputs from the user 106 for operating the elevator 102, as shown in FIG. 1.

In some cases, the elevator 102 may be operated via a contactless input. To that end, the elevator 102 may be equipped with a multi-input call panel that includes both contact-based and contactless functionalities for operating the elevator 102. For instance, the contactless functionality may be implemented to the existing contact-based input panel 104A via the multi-input call panel.

Such implementation of the contactless functionality in the multi-input call panel prevents replacement of the contact-based input panel 104A. Such multi-input call panel is described further with reference to FIG. 2A.

Figure 2A:
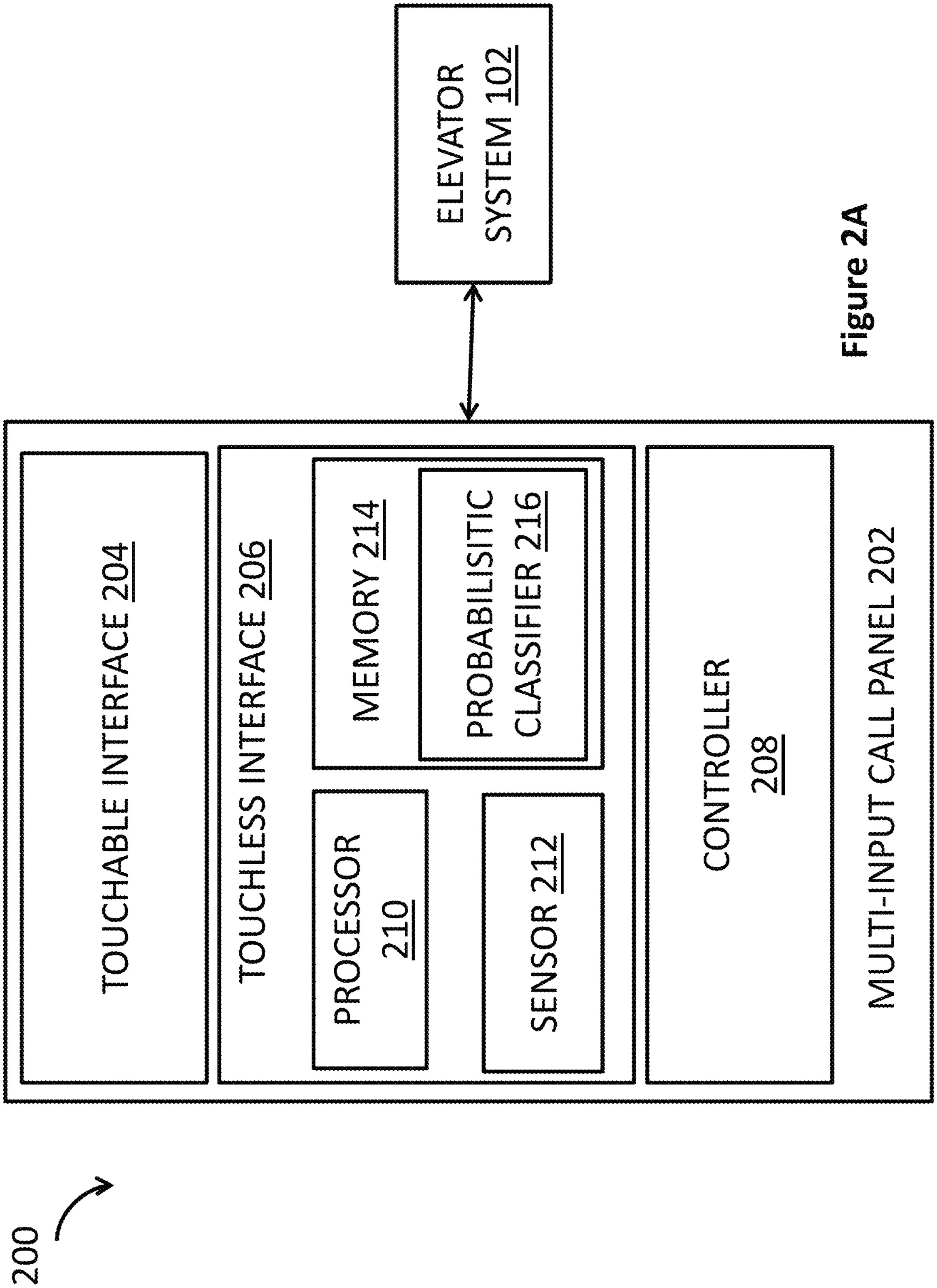
FIG. 2A shows a block diagram of a system for controlling an operation of an elevator system using a multi-input call panel, according to one example embodiment of the present disclosure.

FIG. 2A shows a block diagram of a system 200 for controlling an operation of the elevator system 102, according to one example embodiment of the present disclosure. The system 200 includes a multi-input call panel 202 that includes a touchable interface 204, a touchless interface 206 and a controller 208. The touchable interface 204 is associated with a plurality of touchable inputs arranged at different locations on the touchable interface 204. The touchable interface 204 corresponds to the contact-based input panel 104A with the touchable inputs, such as buttons, keypads, and the like. The touchless interface 206 includes a processor 210 operatively connected to a sensor 212 and a memory 214 storing a probabilistic classifier 216. The controller 208 is configured to control the operation of the elevator system 102 according to a control command associated with a touchable input of the plurality of touchable inputs.

In some example embodiments, the touchable interface 204 may include multiple mechanical switches, an electrically controlled relay or a switching transistor that may be wired in parallel to each mechanical switch. Furthermore, a state of each of the mechanical switches (i.e., an open or a closed state) may be detected and recorded into a database by means of a suitable electronic circuit added to terminals of the mechanical switches, or an input by an auxiliary path, such as up-down-select switches, a scroll wheel, a keypad, or a debugging or programming interface running on an external device, such as a computer, a laptop, etc. When the touchable interface 204 is implemented with software for a touch screen, coordinates of a corresponding point where the user 106 touches the screen may be recorded by the software, and touch inputs on the screen may be simulated. To that end, the touchable interface 204 with above wired arrangement, the sensor 212 may be installed at a suitable location close to the touchable interface 204. For instance, the sensor 212 may be attached on the same wall where the touchable interface 206 is installed.

In some embodiments, the sensor 212 is arranged to sense motion in proximity to the touchable interface 204. In one example embodiment, the sensor 212 may detect position of inputs, such as fingertips or hand gestures of the user 106 in front of the touchable interface 204. The sensor 212 may include a thermal sensor (e.g., an infrared (IR) sensor) a Leap Motion sensor, a Red, Green, Blue Depth (RGBD) sensor camera, Light Detection and Ranging (LIDAR) sensor, or the like. The sensor 212 may output a depth field of a visual scene in front of the touchable interface 204. The depth field may be represented in a coordinate frame of reference attached to the sensor 212. In some cases, the sensor 212 may obtain depth information by means of triangulation technique. Using the triangulation technique, multiple sensors of the sensor 212 may be combined to obtain the depth information when the fingertips of the user 106 move in front of the sensor 212. For instance, the LIDAR sensor is paired with other sensor, such as the RGBD camera. The LIDAR may emit laser beams sweeping in space in front of the sensor 212 and the RGBD camera may detect and capture a fingertip approaching towards the sensor 212. When the fingertip falls on the laser beams, position or depth information of the fingertips may be recorded. Such position or depth information of the fingertips of the user 106 may be utilized to detect motion in the proximity to the touchable interface 204.

In some embodiments, the processor 210 is configured to receive readings from the sensor 212. The processor 210 is further configured to, in response to receiving the readings, execute the probabilistic classifier 216. Some of the non-limiting example of the probabilistic classifier 216 may include a Naïve Bayes classifier, a k-Nearest Neighbor classifier, a Gaussian Mixture Model classifier, a Support Vector Machine classifier, a classifier based on Parzen Kernel Density Estimates, as well as various types of neural network classifiers.

In some embodiments, the probabilistic classifier 216 may be trained based on a training program that may be stored in the memory 214. In some example embodiments, the processor 210 may be configured to record physical button presses of the touchable interface 204 based on the readings of the sensor 212 and register the button presses on behalf of the user 106.

In some embodiments, the controller 208 is configured to control the operation of the elevator system 102. The control is executed according to a control command associated with a touchable input of the plurality of touchable inputs. When the touchable interface 204 receives a user input (i.e. a touchable input), the probabilistic classifier 216 outputs the probability of an intention to touch the touchable input above a threshold or both. The threshold may act as a buffer between the readings of the sensor 212 and the touchable input of the touchable interface 204 because smaller the threshold greater is distance from the readings of the sensor and the touchable input, when the probability classifier 216 detects the intention.

In some cases, the touchable interface 204 may have different types and/or structure. For instance, arrangements of control buttons, floor buttons, display screen or the like may be different for different types of touchable interfaces. In such cases, installation of the multi-input call panel 202 may vary due to the differences in the type of touchable interfaces. To that end, the probabilistic classifier 216 may be trained on-site at the time of installation of the multi-input call panel 202. In the on-site training, the probabilistic classifier 216 may be trained in response to a touch of a button of the touchable interface 204. Such on-site training of the probabilistic classifier 216 may prevent additional steps, such as measurements related to touchless inputs to the touchless interface 206 and/or additional resources, such as instruments for the measurements. In this manner, overall installation and/or maintenance process of the multi-input call panel 202 may be improved in a cost-effective and feasible manner. Additionally or alternatively, the training may be performed by an installer during the installation and/or maintenance of the multi-input call panel 202.

Figure 2B:
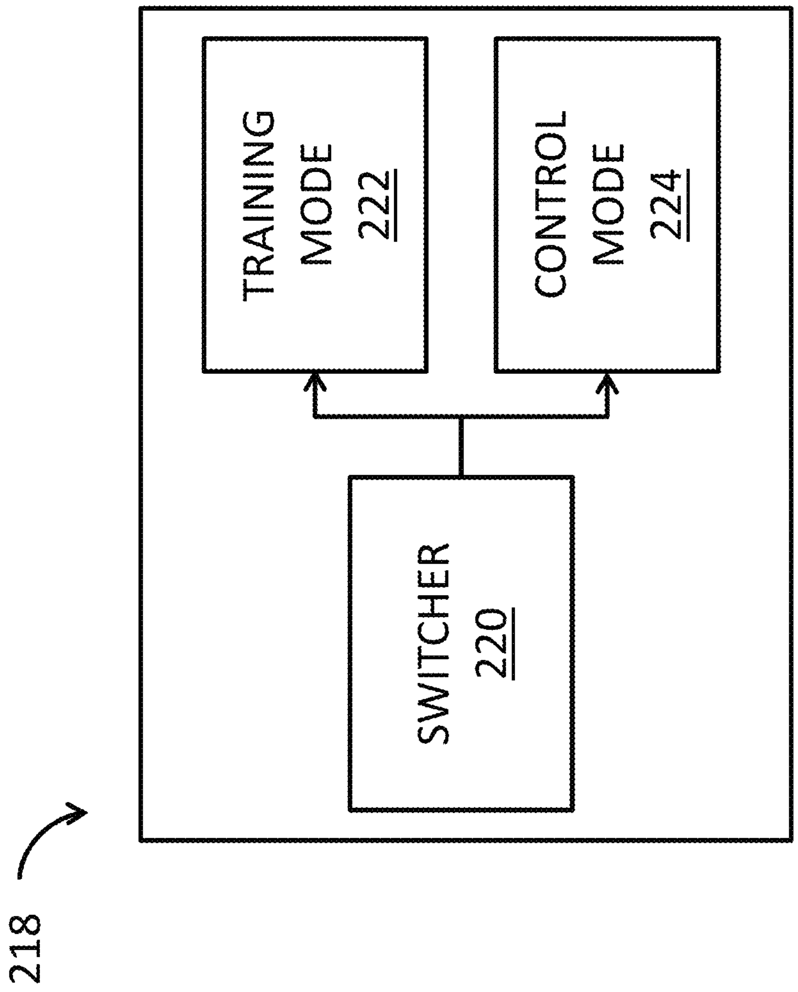
FIG. 2B shows a schematic diagram of a switcher of the multi-input call panel, according to one example embodiment of the present disclosure.

To that end, the multi-input call panel 202 may be configured to operate in two different modes, which is described further with reference to FIG. 2B.

FIG. 2B shows a schematic diagram 218 of a switcher 220 of the multi-input call panel 202, according to one example embodiment of the present disclosure. The switcher 220 is configured to change modes of operation of the multi-input call panel 202. In some embodiments, the multi-input call panel 202 includes a switcher, such as the switcher 220. The switcher 220 is configured to change modes of operation of the multi-input call panel 202.

The modes of operation include a training mode 222 and a control mode 224. In some example embodiments, during the training mode 222, touch input dataset and sensor dataset from the sensor 212 are collected. The touch input dataset corresponds to a plurality of touch inputs for the touchable interface 204, and the sensor dataset corresponds to readings of the sensor preceding the plurality of touch inputs. The readings in the touch input dataset an the sensor dataset are labelled with time stamps, thus establishing a temporal correspondence between the plurality of touch inputs and the sensor readings immediately preceding the plurality of touch inputs in time. This allows the sequence of sensor inputs to be labelled with corresponding number of the button that was registered by means of touch input.

For instance, information of the sensor dataset corresponding to a touch input on a first button of the touchable interface 204 may include a label, such as '1'. Such information of the sensor dataset is associated to a label of the first button indicative of a first floor of a building.

During the control mode 224, the plurality of touch inputs and outputs of the probabilistic classifier 216 are used to control the operation of the elevator system 102.

Figure 3:
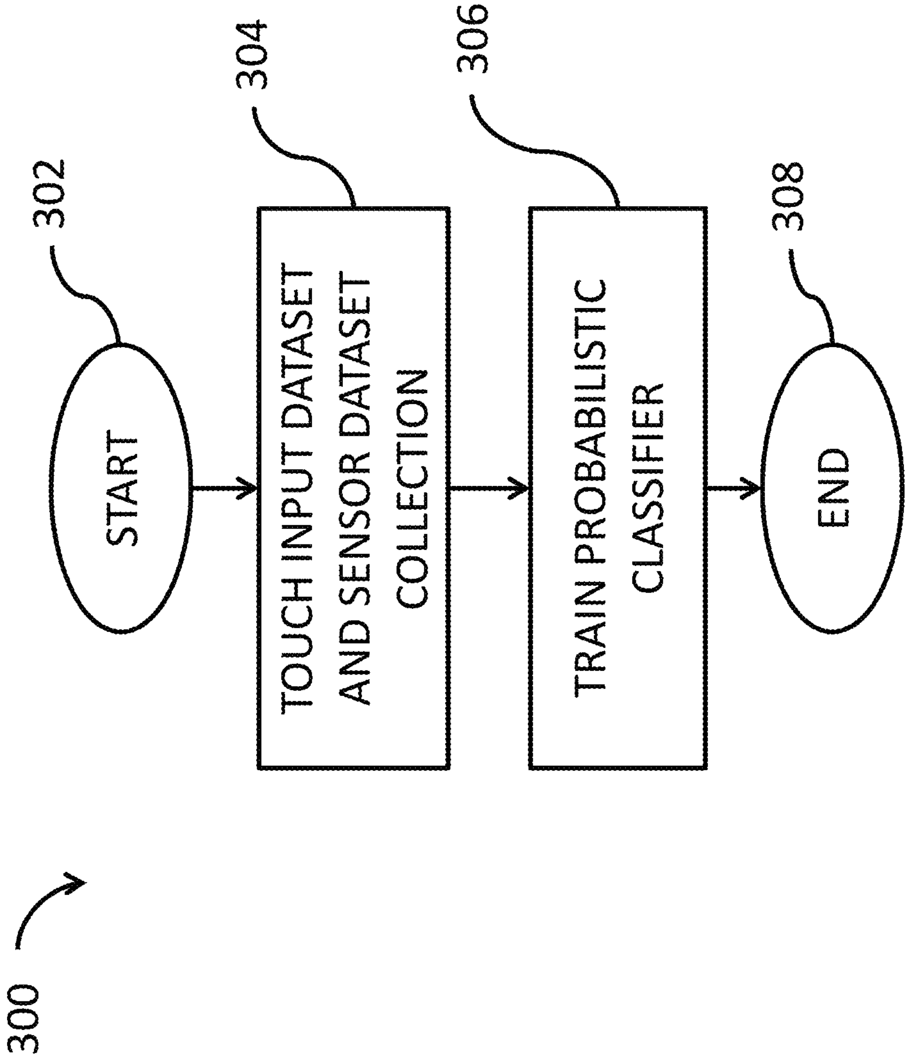
FIG. 3 shows a flowchart illustrating a process corresponding to a training mode of the multi-input call panel, according to one example embodiment of the present disclosure.

The steps of training the probabilistic classifier 216 in the training mode 222 are described further with reference to FIG. 3.

FIG. 3 shows a flowchart illustrating a process 300 corresponding to execution of the training mode 222 of the multi-input call panel 202, according to one example embodiment of the present disclosure. The process 300 starts at step 302. The steps of the process 300 may be executed by the processor 210 of the touchless interface 206 to train the probabilistic classifier 216 in the memory 214. In some cases, the probabilistic classifier 216 may be in the training mode 222, during installation and/or maintenance of the multi-call input panel 202. In such cases, an installer may perform an on-site training of the probabilistic classifier 216. In some other cases, the probabilistic classifier 216 may be trained in advance in an offline manner. In such cases, the training of the probabilistic classifier 216 may begin in response to receiving a touch input on a button of the touchable interface 204.

In yet other cases, data collection for training of the probabilistic classifier 216 may be collected during normal touch-based operations of the multi-input call panel 202, while it is being operated by regular users, such as the user 106. The collected data may be categorized into a training dataset and a testing dataset. The probabilistic classifier 216 may be trained based on the training dataset. The testing dataset may be used to test ability of the probability classifier 216 to correctly predict button touches before occurrence of the button touches. Once accuracy of the prediction on the testing dataset exceeds a threshold, for example 99.99%, the probability classifier 216 may be declared ready for touchless operation in the control mode 224.

In both cases of the on-site and the offline training, the installer may input a minimal set of demonstration that may include inputting a plurality of touch inputs on each button of the touchable interface 204 at appropriate times in a regular manner. For instance, the installer may provide touch inputs on same buttons, such as touch a button in different ways at several times. The touch inputs on each of the buttons may be detected and recorded as readings by the sensor 212.

At step 304, touch input dataset of the touchable interface 204 and sensor dataset of the sensor 212 are received. The touch input dataset may include touch inputs of one or multiple buttons of the touchable interface 204. The sensor dataset may include readings of the sensor 212 preceding the touch inputs. The collected touch input dataset and the sensor dataset may be stored in the memory 214.

At step 306, the probabilistic classifier 216 is trained based on the touch input dataset and the sensor dataset. At step 308, the process 300 ends.

The probabilistic classifier 216 is trained to classify touchless inputs intended to press the buttons of the touchless interface 206 based on actual touch inputs of the touchable interface 204. The actual touch inputs of the touchable interface 204 guides the probabilistic classifier 216, which enables the touchless interface 206 to become intuitive for users, such as the user 106 of the elevator 102. The guidance of the touch inputs of the touchable interface 204 eliminates need for skilled experts for the installation, which saves deployment time in a cost-effective and feasible manner. In this manner, the multi-input call panel 202 provides a joint usage of the touchable interface 204 and the touchless interface 206.

Figure 4:
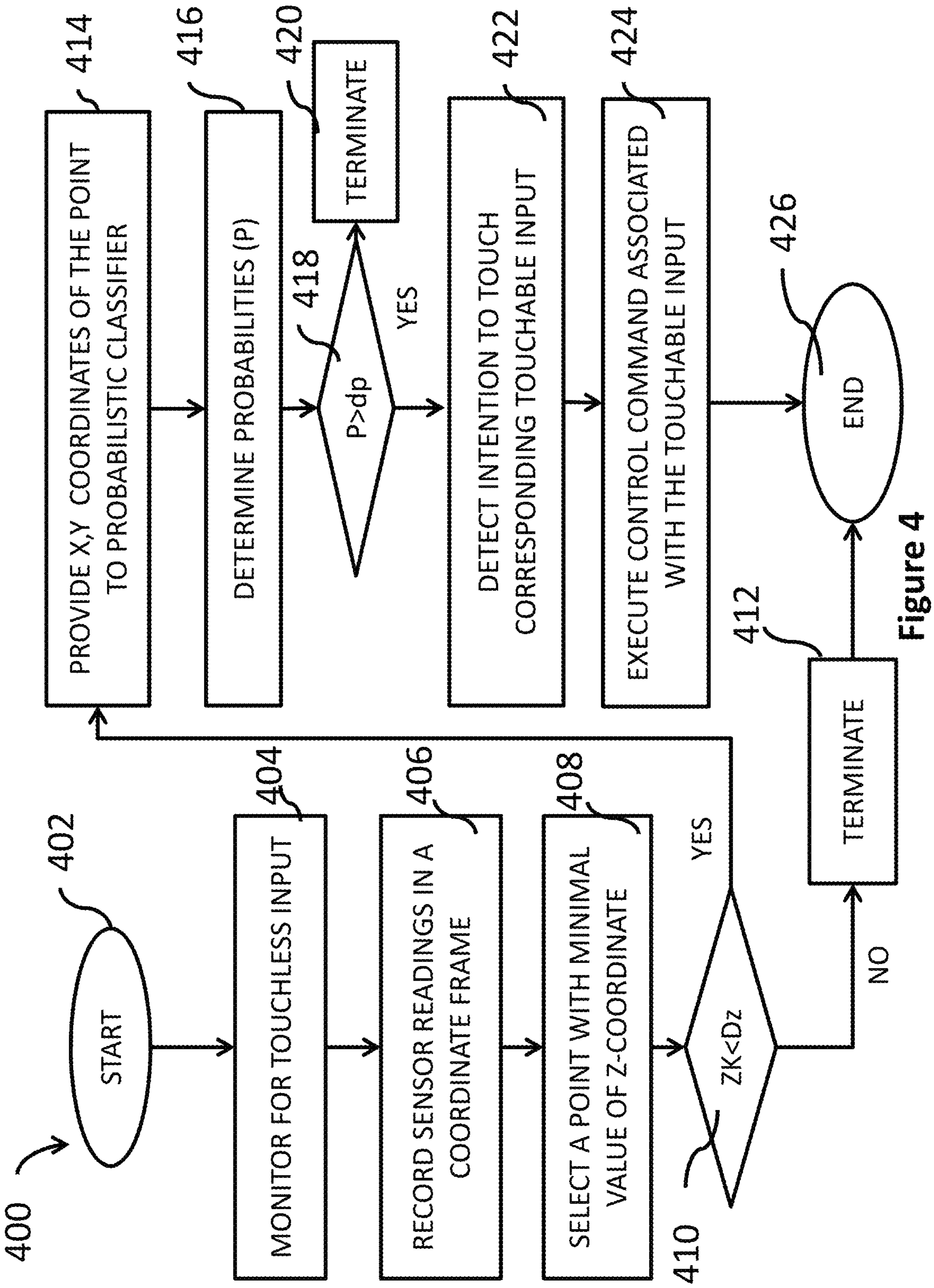
FIG. 4 shows a flowchart illustrating a process corresponding to a control mode of the multi-input call panel, according to one example embodiment of the present disclosure.

After the training, the probabilistic classifier 216 is deployed for regular operation of the elevator 102, which is described further with reference to FIG. 4.

FIG. 4 shows a flowchart illustrating a process 400 corresponding to the control mode of 224 of the multi-input call panel 202, according to one example embodiment of the present disclosure. At step 402, the process 400 starts. The steps of the flowchart 400 are executed by the processor 210 of the touchless interface 206.

At step 404, the sensor 212 continuously monitors for touchless input in proximity of the multi-input call panel 202.

In some example embodiments, the sensor 212 measures readings that include coordinate points, such as spatial coordinates along x, y, and z axes corresponding to a touchless input, e.g., fingertip of the user 106 approaching the touchless interface 206. The spatial coordinates may be represented by $(x_j, y_j, z_j)$, where j=1,m.

At step 406, readings of the sensor 212 that includes the spatial coordinates are recorded in a coordinate frame of the touchable interface 204. For instance, the spatial coordinates of the hand gesture is in the coordinate frame of a button panel. In this coordinate frame, the plane z=0 corresponds to the plane of the touchable interface 204.

At step 408, a point with minimal value of z-coordinate (i.e., $z_k=\min_j(z_j)$, $k=\operatorname{argmin}_j(z_j)$, j=1,m) is selected from the spatial coordinates.

At step 410, the point with the minimal value $z_k$ is compared against a predefined threshold (dz), such as 10 mm. At step 412, the touchless input is terminated. At step 414, the x,y coordinates of the point, $(x_k, y_k)$ are given as input to the probabilistic classifier 216, if $z_k<dz$.

At step 416, the probabilistic classifier 216 determines probabilities $Pr(b_i|x_k,y_k)$, i=1,n indicating the likelihood that each of the possible n buttons of the touchable interface 204 is being targeted by the user 106.

At step 418, a probability P from the probabilities is compared against a threshold, i.e., $p_i>dp$, where $p_i=Pr(b_i|x_k, y_k)$ of some button label $b_i$ and dp is the threshold.

In some alternate embodiments, the probabilities may be used to accumulate evidence, over multiple moments in time, for the detection of the intention. In one example embodiment, the evidence may be accumulated based on Bayes' rule.

According to Bayes' rule, a probability of an event, such as outcomes corresponding to pressing a button of the touchable interface 204, is based on prior knowledge of conditions corresponding to the event. To that end, prior to measurement of any readings by the sensor 212, there is an assumption that chances of contact on each button of the touchable interface 204 may be represented by prior probabilities $p_i(0)$, using Bayes' rule.

In some cases, these probabilities may be uniform for all buttons ($p_i(0)=1/n$, for every i=1,n) of the touchable interface 204. For instance, frequency of pressing all buttons is uniform. In some other cases, the probabilities may be non-uniform. For instance, some buttons may be pressed more often than others, and statistical information about their relative frequency may be available. For example, a button corresponding to a lobby of a building may be pressed more often than any other buttons in the touchable interface 204.

Further, using Bayes' rule, posterior probabilities $Pr[b_i|x_k(t),y_k(t)]$ are updated based on projection of a closest point in spatial coordinates (i.e., $[x_k(t),y_k(t)]$) belonging to a user's hand. The closest point is detected, when distance between a tip of the user's hand at a plane and the touchable interface 204 at time t is within the threshold dz. Therefore, the posterior probabilities $Pr[b_i|x_k(t),y_k(t)]$ are updated as, $$Pr[b_i|x_k(t),y_k(t)]=Pr(b_i)Pr[x_k(t),y_k(t)|b_i]/Pr[x_k(t),y_k(t)]$$

Here, $Pr(b_i)=p_i(0)$ is the prior probability that button $b_i$ of the touchable interface 204 is a target, and $Pr[x_k(t),y_k(t)|b_i]$ is the posterior probability that the closest point $[x_k(t),y_k(t)]$ is to be registered by the sensor 212 when $b_i$ is the intended button to be pressed.

In Bayes' rule, a posterior probability $Pr[x_k(t),y_k(t)]$ is a constant that may be estimated as a normalization factor. After computation of probabilities $Pr(b_i)Pr[x_k(t),y_k(t),y_k(t)|b_i]$, the posterior probabilities sum up to one. The posterior probability may not depend on a class label of the target button. The posterior probability $p_i(t)=Pr[b_i|x_k(t),y_k(t)]$ may be computed after a first spatial coordinate $[x_k(t),y_k(t)]$ of the fingertip intending to press a button is detected. In a similar manner, spatial coordinates corresponding to fingertips intending to press different buttons may be accumulated for evidence at a time t+dt, where dt denotes a time interval. The accumulation of evidence may be equal to a sampling rate of the sensor 212. To that end, probabilities intending to press different buttons based on the accumulated evidence, may be represented as $$Pr[b_i|x_k(t+dt),y_k(t+dt),x_k(t),y_k(t)]=Pr(b_i|x_k(t),y_k(t))Pr[x_k(t+dt),y_k(t+dt)|b_i]/Pr[x_k(t+dt),y_k(t+dt)]$$

Alternatively, the probability that the user intends to press button $b_i$ based on the entire evidence collected since his/her hand first came into proximity with the button panel, up to the last sensing event $[x_k(t+dt),y_k(t+dt)]$ registered at time t+dt, may be denoted by $$P_i(t+dt)=Pr[b_i|x_k(t+dt),y_k(t+dt),x_k(t),y_k(t)], \ldots]$$

Using a simple recursive update rule for the above probability, starting with the prior probability, may be obtained as:

$$P_i(t+dt)=aP_i(t+dt)Pr[x_k(t+dt),y_k(t+dt)|b_i],P_i(0)=Pr(b_i|\{\varnothing\})=p_i(0),$$

where 'a' is a normalization constant selected so that $\Sigma_{i=1}^{n}P_i(t+dt)=1$.

The accumulation of evidence may continue until either the posterior probability exceeds the threshold (dp), or there is a moment in time where the sensor 212 does not indicate that any part of the user's hand is close to the touchable interface 204, possibly because the user has given up on pressing a button, in which case the posterior probability may be reset back to the prior probability, in expectation for future sensing events caused by the same or other users.

In some other embodiments, the probability of pressing the target button may be estimated by means of a generative probabilistic model. The generative probabilistic model may be learned from the touchable inputs of the touchable interface 204 and readings of the sensor 212 preceding the touch inputs. In some other embodiments, during the training mode 222, the probabilities may be estimated based on Naïve Bayes, Gaussian Mixture Models, deep generative models, and the like.

Regardless of which method for interpreting the output of the probabilistic classifier 216, the multi-input call panel 202 operates in a continuous loop for monitoring parts of the user's hand in proximity with the touchable interface 204, and registering button presses, when it is sufficiently certain that this is the user's intention.

At step 420, the process 400 is terminated if the probability is less than the threshold. At step 422, intention of the touch input corresponding to the touchable input is detected.

At step 424, a control command associated with the touchable input is executed. At step 426, the process 400 ends.

Figure 5A:
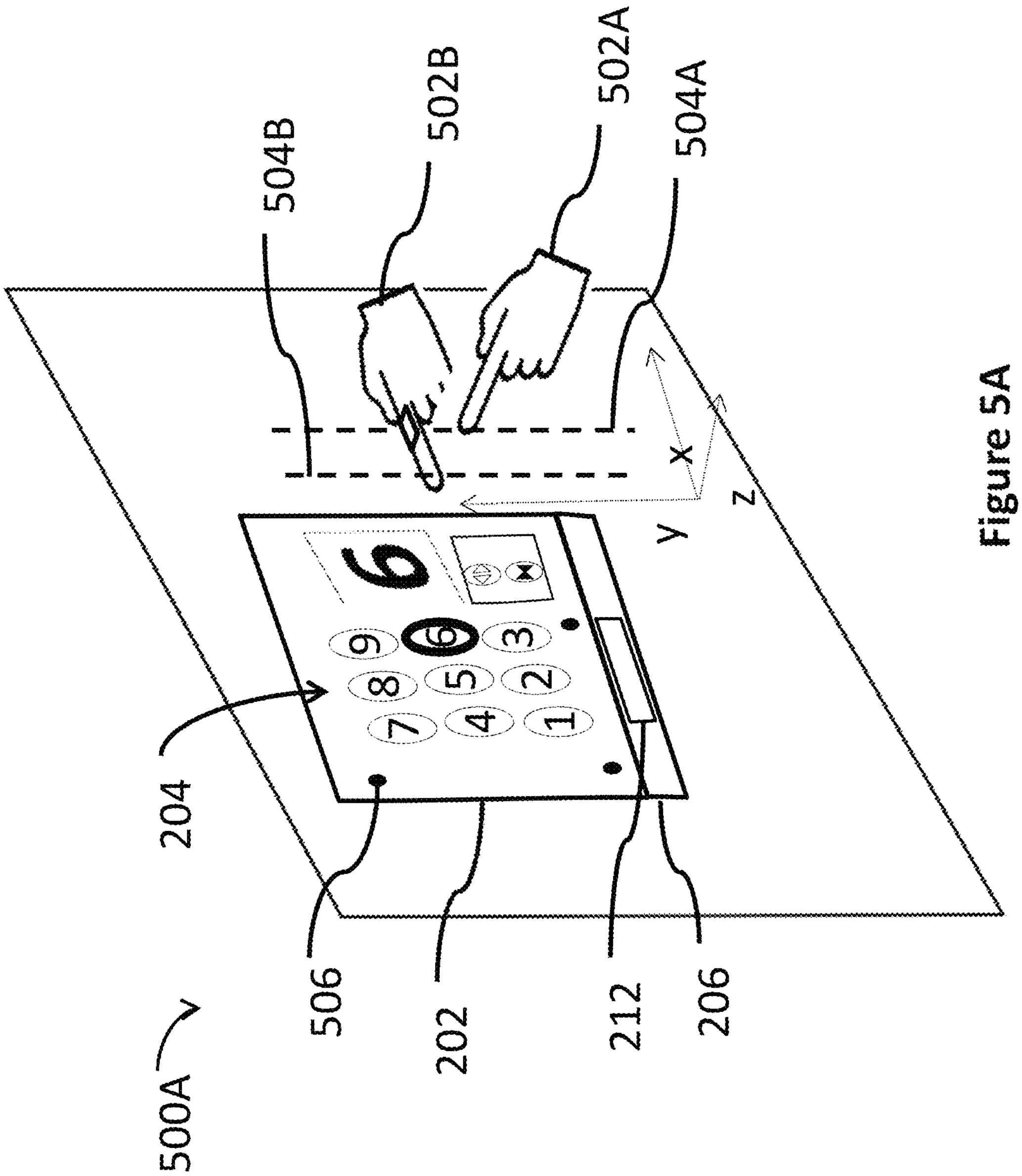
FIG. 5A illustrates a scenario depicting training of the multi-input call panel, according to one example embodiment of the present disclosure.

FIG. 5A illustrates a scenario 500A depicting training of the multi-input call panel 202, according to one example embodiment of the present disclosure. In the illustrative example scenario 500A, the sensor 212 may monitor for a touchless input, such as a hand gesture 502A of a user, such as the user 106. The hand gesture 502A may intend to press a button indicative of sixth floor of the building. In some cases, the hand gesture 502A may intend to press an operational button indicative of an emergency call button (not shown). The sensor 212 may detect the touchless input when the hand gesture 502A crosses a plane, such as a plane 504A parallel to the multi-input call panel 202. The plane 504A may be fixed at a predefined distance, e.g., 20 mm. In some example embodiments, the button that the user 108 intends to press may be highlighted prior to actual touching on the button the user 108. The button may be highlighted based on a color light, as shown in FIG. 5A.

In some cases, a different user with a hand gesture 502B may also intend to press the same button. The hand gestures 502A and 502B may differ in height as height of the user 108 corresponding to the hand gesture 502A may be shorter than that of hand gesture 502B, as shown in FIG. 5A. This difference in height may impact the probabilistic classifier 216 in generating corresponding output of the intention to press the button. To that end, some embodiments may use multiple planes, such as a plane 504B in parallel to each other to execute the probabilistic classifier 216, as shown in FIG. 5A.

Figure 6:
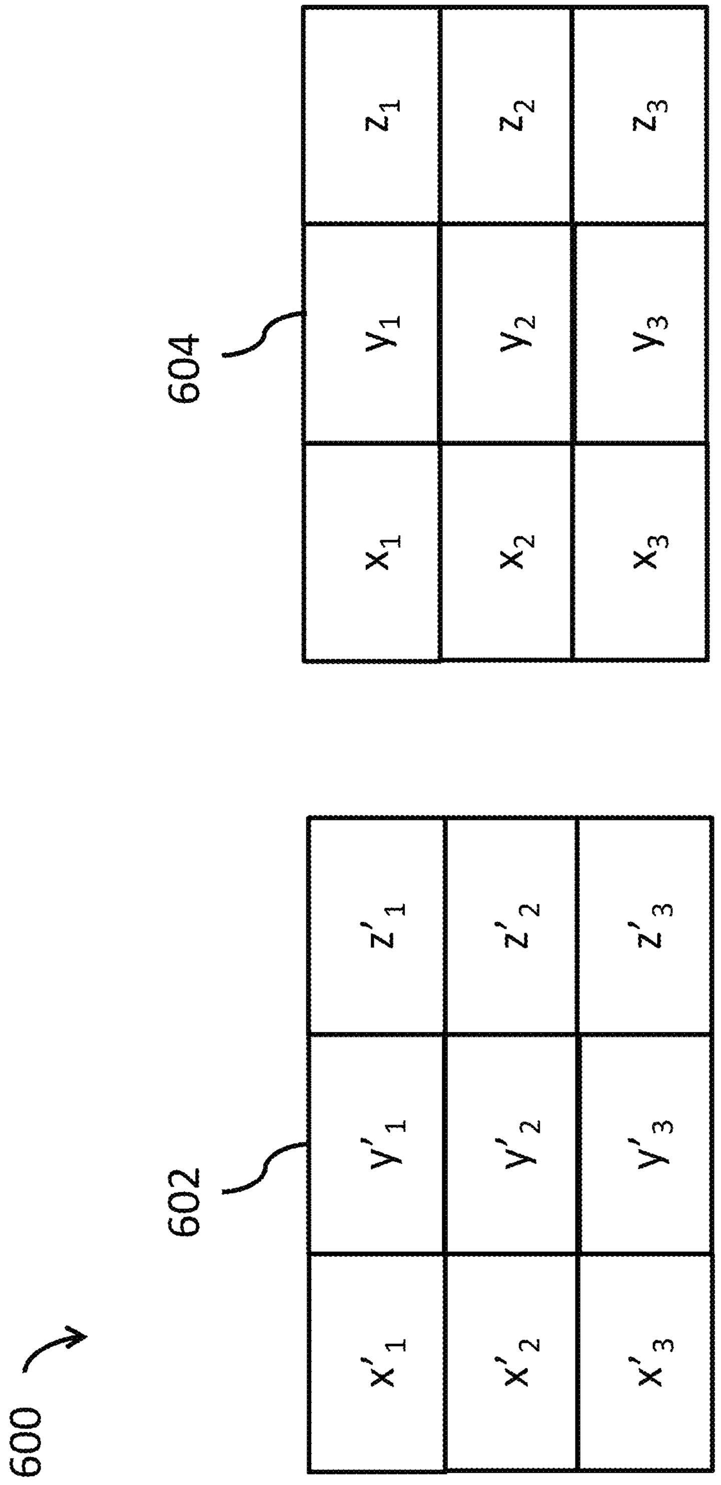
FIG. 6 shows a tabular representation corresponding to a coordinate frame of a sensor and a coordinate frame of a touchable interface of the multi-input call panel, according to one example embodiment of the present disclosure.

Initially, during the installation process, a correspondence is established between a coordinate frame of the sensor 212 and a coordinate frame of the touchable interface 204 (shown in FIG. 6). When the correspondence between the coordinate frames is established, an origin of the coordinate frame of the sensor 212 is a point on the touchable interface 204. The coordinate frame of the sensor 212 may project a coordinate plane of the sensor 212 with z-axis of the coordinate frame perpendicular to the coordinate plane of the sensor 212.

In some example embodiments, the correspondence may be established based on a generic calibration method. The generic calibration method may calibrate the correspondence based on type of the 212 sensor. In this way, the establishment of the correspondence is independent of a layout of the touchable interface 204. To that end, a set of markers 506 may be attached to the touchable interface 204 to define a coordinate plane corresponding to the coordinate frame of the touchable interface 204. In some example embodiments, the correspondence may be defined by a rigid body transformation that maps the coordinate frame of the sensor 212 to the coordinate frame of the touchable interface 204. Once the correspondence is established, all readings of the sensor 212 are mapped to the coordinate frame of the touchable interface 204. The mapping of the coordinate frames of the sensor 212 and the touchable interface 204 is described further with reference to FIG. 6.

In particular, the sensor 212 starts recording readings that include positions, i.e., locations of the hand gestures 502A and 502B, when the hand gestures 502A and 502B crosses the corresponding planes 504A and 504B. The positions may be represented in spatial coordinates, such as x,y coordinates. To that end, spatial coordinates of the corresponding hand gestures 502A and 502B and corresponding labels of buttons intended to be pressed by the user 106 during the training are input to the probabilistic classifier 216.

Figure 5B:
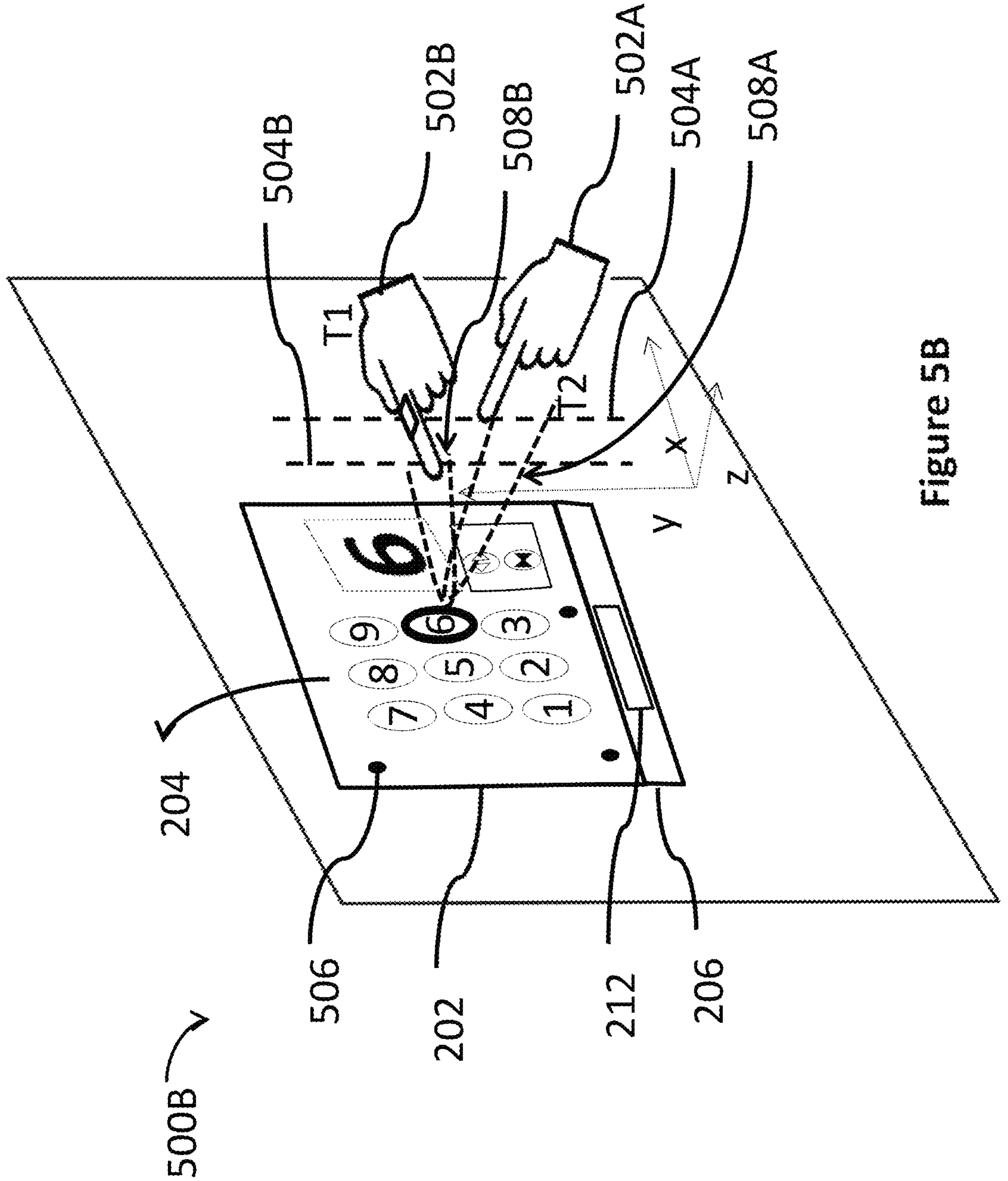
FIG. 5B illustrates a scenario depicting training of the multi-input call panel, according to another example embodiment of the present disclosure.

In some example embodiments, relationship between different readings at different planes may be used to extract readings of the sensor for the training and the control of the multi-input call panel, which is explained in FIG. 5B.

FIG. 5B illustrates a scenario 500B depicting a training of the multi-input call panel 202, according to another example embodiment of the present disclosure. In some example embodiments, extrapolated curves of the locations of the hand gestures 502A and 502B ending at corresponding buttons on the touchable interface 204 may be used for the training of the probabilistic classifier. For instance, the locations of the hand gestures 502A and 502B crossing each of the planes 504A and 504B may be extrapolated to produce an extrapolated curve, such as extrapolated curve 508A corresponding to the hand gesture 502A and an extrapolated curve 508B corresponding to the hand gesture 502B, as shown in FIG. 5B.

In an example scenario, a sequence of locations (x, y coordinates) corresponding to the hand gesture 502A and 502B in Z planes or at different time-series T1, T2, T3, . . . Tn is detected and extrapolated to obtain the extrapolated curves 508A and 508B. The sequence of x,y coordinates of the hand gestures 502A and 502B at corresponding time T1 and T2 may be extrapolated, as shown in FIG. 5B. In one example embodiment, the processor 210 may extrapolate the sequence of x,y coordinates of the hand gestures 502A and 502B based on one or a combination of linear regression, Catmull-Rom splines, cubic Hermite splines, or other similar means. In some implementations, the extrapolation may use cubic splines, in which the last few, e.g., four points are sufficient to fit a cubic curve, and extrapolates it for z=0. In some embodiments, the extrapolation of the sequence of x,y coordinates may be used to calculate a predicted "touch impact point" at the Z=0 plane of buttons on the touchable interface 204. The predicted touch impact point (PTIP) may be used in the training mode 222 of the probabilistic classifier 216.

Further, the coordinates corresponding to the extrapolated curves 508A and 508B may be provided to training probabilistic classifier 216. Such training based on the extrapolated curves 508A and 508B on different planes 504A and 504B at different time-series enables the probabilistic classifier 216 to become robust to different ways of touching the buttons by different users.

As mentioned earlier, a correspondence is established between a coordinate frame of the sensor 212 and a coordinate frame of the touchable interface 204 in the installation of the multi-input call panel 202. Such coordinate frame of the sensor 212 and the coordinate frame of the touchable interface 204 are shown in FIG. 6.

FIG. 6 shows a tabular representation 600 corresponding to coordinate frames of the touchable interface 204 and the touchless interface 206 of the multi-input call panel 202, according to one example embodiment of the present disclosure. The tabular representation 600 includes a coordinate frame 602 corresponding to readings of the sensor 212 and a coordinate frame 604 corresponding to the touchable interface 204. In some example embodiments, the readings of the sensor 212 may record location of an input of the user 106, such as a location of a point that the user 106 places a finger at a plane (e.g., the plane 504A or the plane 504B) in front of the sensor 212. The location may be represented in x,y,z coordinates in the coordinate frame 604. Further, each coordinate in the coordinate frame 602 may be obtained by means of a rigid body transformation. The rigid body transformation maps the coordinate frame 602 to the coordinate frame 604 and defines a correspondence between the coordinate frame 602 and the coordinate frame 604. Such correspondence between the coordinate frame 602 and the coordinate frame 604 may be established from a minimal set of demonstration performed during the installation of the multi-input call panel 202 by an installer without any technical or programming skills.

Further, the coordinates of sensed points in the coordinate frame 604 may be inputted to the probabilistic classifier 216 during the training mode 222. In the control mode 224, the probabilistic classifier 216 may perform a mapping between an intention of the user 106 to touch a button of the touchable interface 204 and a corresponding class label of the intended button using the coordinate frame 602 and the coordinate frame 604, which is shown in FIG. 7.

FIG. 7 shows a tabular representation 700 depicting a mapping of touchless input intended to touch a button on the touchable interface 204, according to one example embodiment of the present disclosure. The tabular representation 700 includes a column 702 and a column 704. The column 702 corresponds to x,y coordinates of locations of the intention to touch a button by the user 106, such as the hand gesture 502A or the hand gesture 502B. The column 704 corresponds to class labels of corresponding buttons that the user 106 eventually presses. For instance, when the hand gesture 502A is at a location $(x_1,y_1)$ of the plane 504A (or the plane 504B), the location is mapped to a button $(b_1)$.

Alternatively, a nearest-neighbor classifier may be applied to location coordinates $[x(t),y(t)]$ of the column 702. The location coordinates may be compared against previously learned (such as location coordinates in the coordinate frame 602). The location coordinates may be corrected as $[x_k(t), y_k(t)] \rightarrow b_i$ mappings based on the comparison. A class label of a button $b_i$ corresponding to the location $[x_k(t),y_k(t)]$ nearest in distance, such as "Euclidean distance" may be selected. The Euclidean distance and the previously learned mapping may be calculated as $r_{err}$=SQRT $((x(t)-x_k(t))^2+(y(t)-y_k(t))^2)$. To that end, a maximum permissible error in location radius $r_{max}$ for the hand gesture 502A or the hand gesture 502B may be enforced by registering no hits when the error radius $(r_{err})$ of the best match is greater than the maximum permitted error radius $r_{max}$.

In some cases, buttons on the touchable interface 204 may be densely arranged. Due to the dense arrangement of the buttons, a finger of the user 106 may lie in between two buttons. In such cases, an emulation of pressing the buttons may be performed during the training mode 222. The pressing of the buttons during the emulation may be recorded and stored in the memory 214. Further, the stored information of the pressed buttons may be used to update coordinates of the locations in the column 702 by adding a correction increment $[x'(t),y'(t)]$ yielding a corrected location coordinates $[x'_k(t),y'_k(t)]$. The correction increment $[x'(t),y'(t)]$ is a vector in direction of the error $[(x(t)—x_k(t)), (y(t)-y_k(t))]$ and a length $r_{update}$ on order of 0.1 mm. Then, copying $[x'k(t),y'k(t)]$ to $[x_k(t),y_k(t)]$ may cause a new location coordinates to be used.

Such adaptive correction may be limited by storing the initial learned location coordinates $[x_k(t),y_k(t)]$ again as $[x_{kinitial}(t),y_{kinitial}(t)]$ and before copying the corrected location coordinates $[x'k(t),y'k(t)]$ to the new location coordinates $[x_k(t),y_k(t)]$. The corrected location coordinates $[x'k(t), y'k(t)]$ may be within a maximum correction radius $r_{maxcorr}$ of the learned location coordinates $[x_{kinitial}(t),y_{kinitial}(t)]$ and inhibiting the copy operation if this is not the case. For example, an initial $r_{maxcorr}$ of 10 to 25 mm may be recommended for spacing 40 to 50 mm between buttons of the touchable interface 204.

The adaptive correction may be applied to each learned location coordinates [xk(t),yk(t)] individually. In some other cases, the sensor 212 may exhibit a low frequency change with time, such as a global drift. To that end, the global drift of the sensor 212 may be avoided by such adaptive correction. The adaptive correction may improve performance of the sensor 212.

Figure 8:
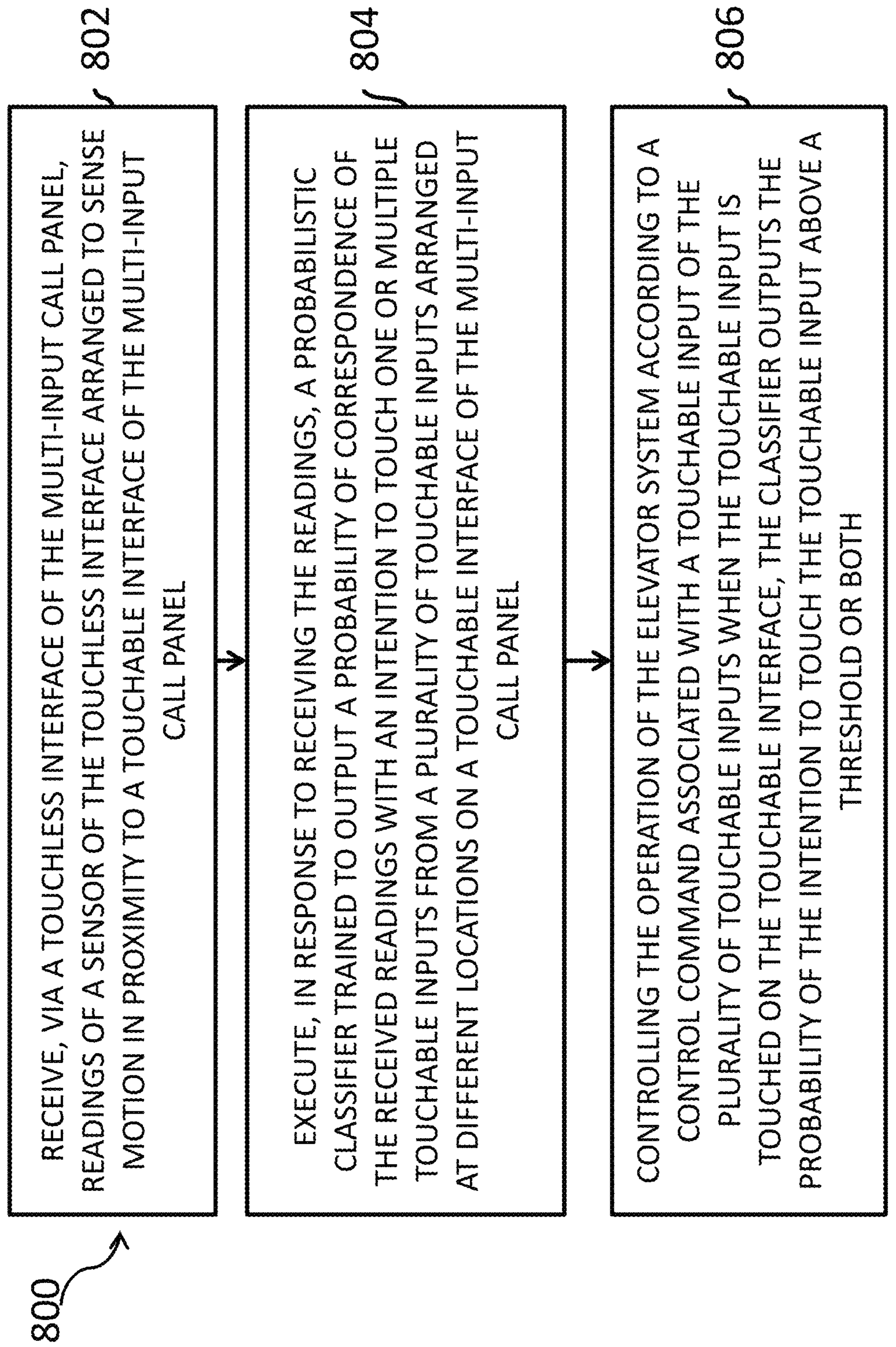
FIG. 8 shows a method flowchart of a multi-input call panel for controlling an operation of an elevator system, according to one example embodiment of the present disclosure.

FIG. 8 shows a flow diagram of a method 800 for controlling an operation of an elevator (e.g., the elevator 102) using the multi-input call panel 202, according to one example embodiment of the present disclosure. The method 800 includes operations 802-806 that are performed by the controller 208 of the multi-input call panel 202.

At operation 802, readings of a sensor (e.g., the sensor 212) are received via a touchless interface (e.g., the touchless interface 206). The sensor 212 is arranged to sense motion in proximity to a touchable interface (e.g., the touchable interface 204) of the multi-input call panel 202.

At operation 804, a probabilistic classifier (e.g., the probabilistic classifier 216) is executed in response to receiving the readings. The probabilistic classifier 216 is trained to output a probability of correspondence of the received readings with an intention to touch one or multiple touchable inputs from a plurality of touchable inputs arranged at different locations on the touchable interface 204.

At operation 806, the operation of the elevator 102 is controlled according to a control command associated with a touchable input of the plurality of touchable inputs when the touchable input is received on the touchable interface 204, the probabilistic classifier 216 outputs the probability of the intention to touch the touchable input above a threshold or both.

Figure 9:
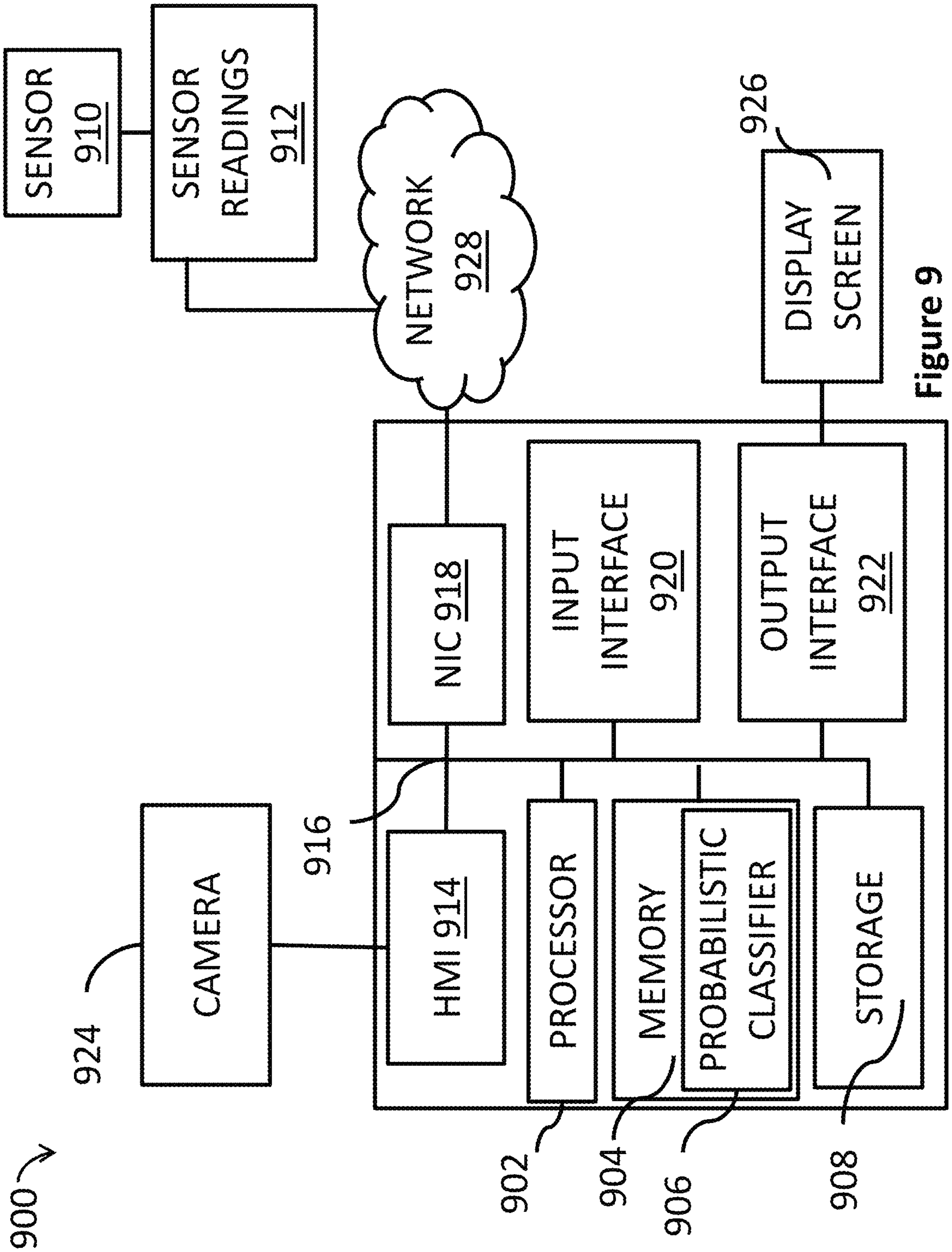
FIG. 9 shows a block diagram of an apparatus of the multi-input call panel for controlling an operation of an elevator system, according to one example embodiment of the present disclosure.

FIG. 9 shows a block diagram of an apparatus 900 for controlling an operation of an elevator (e.g. the elevator 102), according to one example embodiment of the present disclosure. The apparatus 900 corresponds to the system 200 of FIGS. 2A and 2B. The apparatus 900 includes a processor 902, a memory 904, and a sensor 908. The memory 904 can include random access memory (RAM), read only memory (ROM), flash memory, or any other suitable memory systems.

The apparatus 900 is configured to implement functionalities of both touchable and touchless interfaces for operating the elevator 102. To that end, the apparatus 900 may include an input interface 920 that corresponds to the touchable interface 204 and the touchless interface 206. In some embodiments, the processor 902 is configured to receive readings of the sensor 910. The sensor 910 corresponds to the sensor 212. The sensor 910 is configured to sense motion in proximity of the touchable interface. In some embodiments, the sensor 910 may include an IR sensor, a light sensor, or the like. Additionally or alternatively, the sensor 910 may include a camera, such as the camera 924. A few examples of the camera 924 may include an RGBD camera.

The processor 902 can be a single core processor, a multi-core processor, a computing cluster, or any number of other configurations. The processor 902 is also configured to execute a probabilistic classifier 906 in the memory 904 in response to receiving the readings. The probabilistic classifier 906 corresponds to the probabilistic classifier 216. In some embodiments, the memory 904 may be configured to store a training program for training the probabilistic classifier 906. In some embodiments, the probabilistic classifier 906 may be trained on-site by an installer. The probabilistic classifier 906 is trained to output a probability of correspondence of the received readings with an intention to touch buttons of the touchable interface 204. In some embodiments, the probabilistic classifier 906 may have two modes of operation, such as the training mode 222 and the control mode 224.

In one implementation, a human machine interface (HMI) 914 within the apparatus 900 connects the apparatus 900 to the camera 924. Additionally or alternatively, a network interface controller (NIC) 918 may be adapted to connect the apparatus 900 through the bus 916 to the network 928. In one implementation, the sensor readings 912 may be received via an input interface 920 of the apparatus 900.

Additionally or alternatively, the apparatus 900 may include a display screen 926 configured to display floor values indicating a destination floor selected by the user 106. The display screen 926 may be connected with the apparatus 900 via an output interface 922. Additionally or alternatively, the output interface 922 may include an audio interface that output an audio signal corresponding to a selected destination floor displayed on the display screen 926. Additionally or alternatively, the output interface 922 may be configured to emit a color light indicative of highlighting on a button of the touchable interface 204 intended to be pressed by the user 108. The highlighting may correspond to a color light emitted on the corresponding button. In some example embodiments, the display screen 926 may be configured to display direction of elevator service of the elevator 102, indicate opening and/closing door of the elevator 102, or the like.

Additionally or alternatively, the apparatus 900 may include a storage 908 configured to store records of current readings of the sensor 910, previous readings of the sensor 910, a plurality of touch inputs from the user 108 during the training mode 222, touch inputs received from different users during the control mode 224, and the like. Additionally or alternatively, the storage 908 may be configured to store coordinate frames corresponding to the sensor 910 and the touchable interface 204. The storage 908 may also be configured to store mapping between intentions of pressing one or multiple touchable inputs (e.g., buttons) of the touchable interface 204 and corresponding class labels of the one or multiple buttons. The data stored in the storage 908 may be accessed through the network 928 for further processing. For instance, the processor 904 may access the storage 928 via the network 928.

Figure 10:
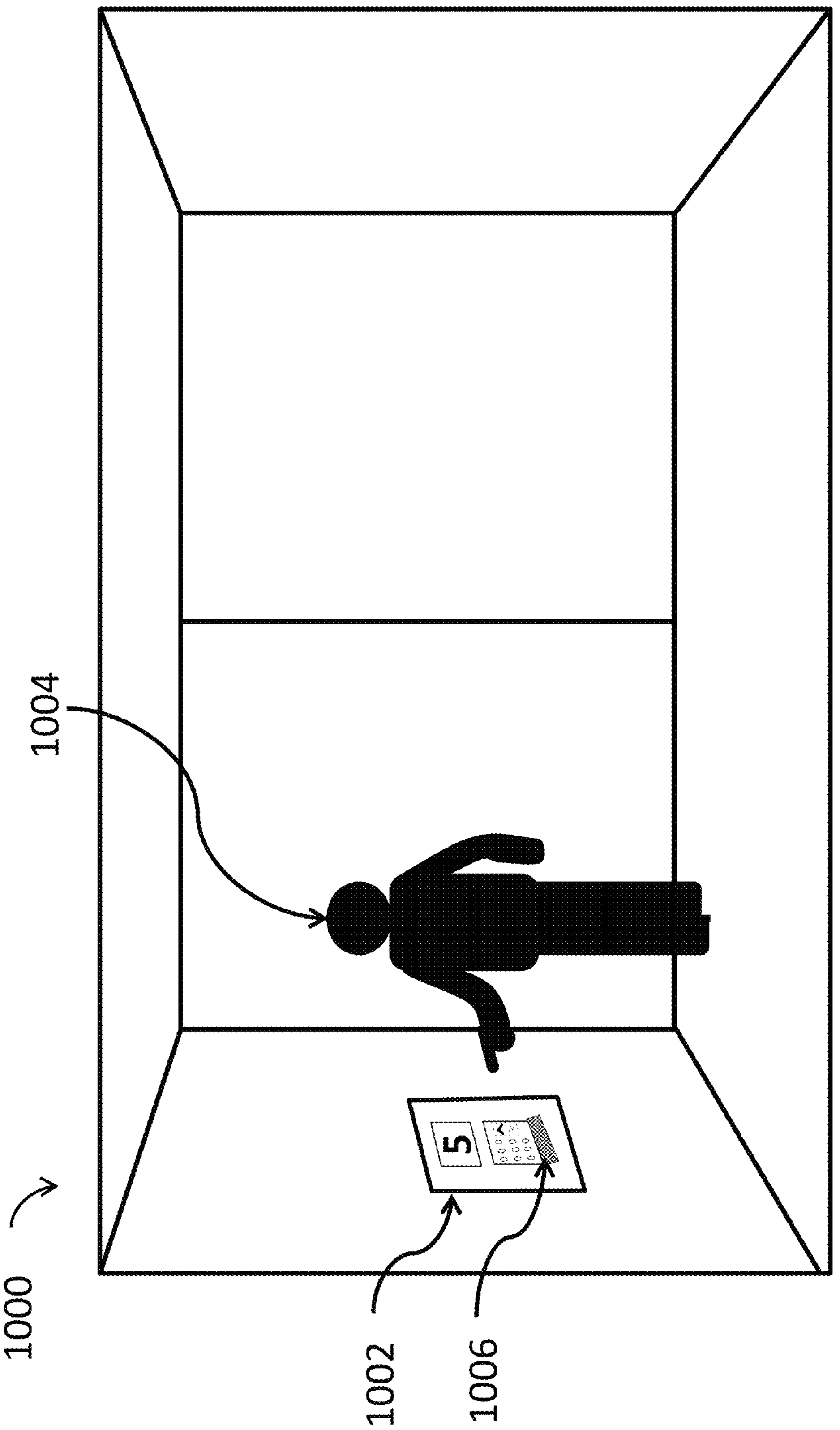
FIG. 10 illustrates a scenario of controlling an operation of an elevator system using the apparatus of the multi-input call panel, according to one example embodiment of the present disclosure.

FIG. 10 illustrates a scenario of controlling an operation of an elevator 1000 by the apparatus 900, according to one example embodiment of the present disclosure. As shown in FIG. 10, the elevator 1000 is equipped with a multi-input call panel 1002 (e.g., the multi-input call panel 202), as shown in FIG. 10. In an illustrative example scenario, a user 1004 enters the elevator 1000. The user 1004 approaches closer to the multi-input call panel 1002 to press a button, such as button 5 on the multi-input call panel 1002 to operate the elevator 1000.

When the user 1004 puts forward his hand to press the button on the multi-input call panel 1002, a sensor 1006 (e.g., the sensor 212) detects motion of the hand in proximity to the multi-input call panel 1002. The multi-input call panel 1002 displays the button that the user 1004 intends to press, before the user 1004 actually touches the button. In some cases, the intended button may be highlighted by a colored light to indicate the button that the user 1004 intends to press.

In this manner, the user 1004 may operate the elevator 1000 without physically touch input, via the multi-input call panel 1002, in an efficient and feasible manner. Such implementation of the multi-call panel 1002 may not be limited to controlling the elevator 1000 designed for transporting people between different floor of a building. In some embodiments, the elevator system is broadly used for transporting people and/or goods.

In different embodiments, different elevator systems may implement such multi-call panel 1002 that supports functionality of both contact-based and contactless panels. For example, a transportation system that controls transportation of goods or loads via a conveyer belt may implement such multi-call panel 1002, in a cost-effective and feasible manner. Further, multi-call panel implementation is described further with reference to FIG. 11.

Figure 11:
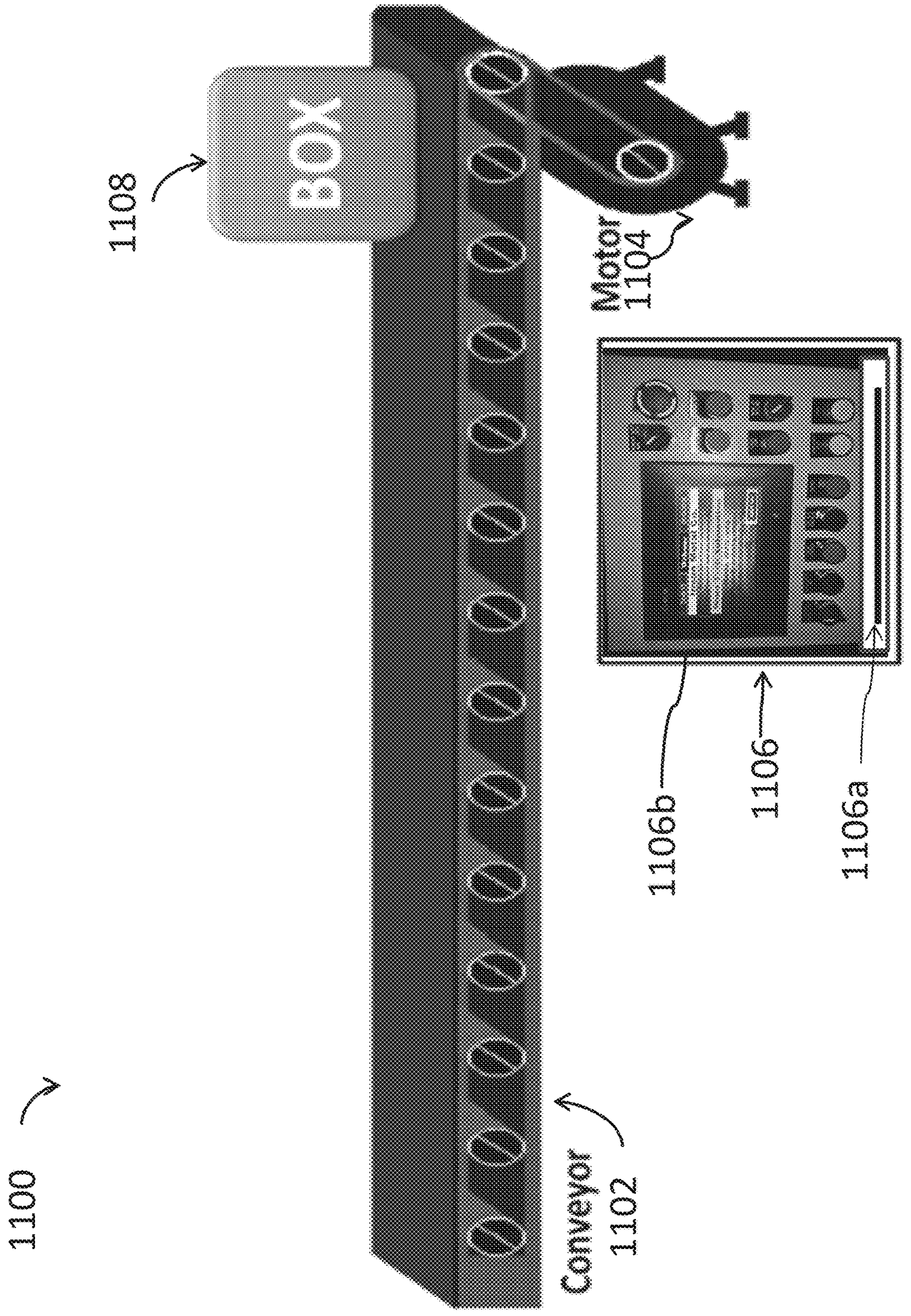
FIG. 11 illustrate a scenario of controlling an operation of a conveyor system by the apparatus, according to another example embodiment of the present disclosure.

FIG. 11 illustrate a scenario 1100 of controlling an operation of a conveyor system 1102 by the apparatus 900, according to another example embodiment of the present disclosure. As shown in FIG. 11, the conveyor system 1102 equipped with a motor 1104, and a multi-input call panel 1106 (e.g., the multi-input call panel 202), as shown in FIG. 11. The multi-input call panel is configured to control a plurality of operations of the conveyor system 1102 to transport goods (such as a box 1108) at one or more destinations. To that end, the multi-input call panel 1106 is utilized to provide inputs. Accordingly, the motor 1104 may operate and transport the box 1108.

In an illustrative example scenario, if a user (not shown) approaches closer to the multi-input call panel 1106 to press a button on the multi-input call panel 1106 to operate the conveyor system 1102, a sensor 1106*a* (e.g., the sensor 212) detects motion of the hand in proximity to the multi-input call panel 1106. The multi-input call panel 1106 displays, on the display 1106*b*, the button that the user intends to press, before the user actually touches the button. In some cases, the intended button may be highlighted by a colored light to indicate the button that the user intends to press.

In this manner, the user may operate the conveyor system 1102 without physically touch input, via the multi-input call panel 1106, in an efficient and feasible manner.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A multi-input call panel for controlling an operation of an elevator system, comprising:

a touchable interface associated with a plurality of touchable inputs arranged at different locations on the multi-input call panel;

a touchless interface including a processor operatively connected to receive readings of a sensor arranged to sense motion in proximity to the touchable interface and configured to, in response to receiving the readings, execute a probabilistic classifier trained to output a probability of correspondence of the received readings with an intention to touch one or multiple touchable inputs from the plurality of touchable inputs; and a controller configured to control the operation of the elevator system according to a control command associated with a touchable input of the plurality of touchable inputs when at least the touchable input is touched on the touchable interface or the probabilistic classifier outputs the probability of the intention to touch the touchable input above a probability threshold.

2. The multi-input call panel of claim 1, further comprising:

a switcher configured to change modes of operation of the multi-input call panel, wherein the modes of operation include a training mode and a control mode, wherein during the training mode, a plurality of touch inputs of the touchable inputs and the readings of the sensor preceding the plurality of touch inputs are collected and used to train the probabilistic classifier, and wherein during the control mode, the plurality of touch inputs and the probability output by the probabilistic classifier are used to control the operation of the elevator system.

3. The multi-input call panel of claim 2, wherein the processor is coupled with a memory configured to store a pretrained probabilistic classifier, and training readings of the sensor that are associated with respective touchable inputs, wherein during the training mode, the readings of the sensor are mapped to the training readings associated with the same touchable input to produce a transformation function, and wherein during the control mode, the readings of the sensor are transformed by the transformation function and submitted to the probabilistic classifier.

4. The multi-input call panel of claim 2, wherein the processor is coupled with a memory configured to store a training program for training the probabilistic classifier, wherein during the training mode, the readings of the sensor leading to touching a corresponding touchable input are labeled with the corresponding touchable input, wherein the training program, upon receiving multiple pairs of readings and the corresponding touchable inputs, trains the probabilistic classifier.

5. The multi-input call panel of claim 2, wherein the sensor is arranged to sense a plane parallel to the multi-input call panel and located at a fixed distance from the multi-input call panel, wherein the processor determines, from readings of the sensor, a location at which a tip of a user's finger crosses the plane.

6. The multi-input call panel of claim 5, wherein the sensor is arranged to sense a set of planes parallel to the multi-input call panel and located at different distances from the multi-input call panel, wherein the processor determines, from readings of the sensor, a location at which a tip of the user's finger crosses each of the planes.

7. The multi-input call panel of claim 6, wherein the locations where the tip of the user's finger crosses each of the planes are extrapolated to produce an extrapolated curve ending at the corresponding touchable input, wherein, during the training mode, the extrapolated curves ending at the corresponding touchable inputs are used for the training of the probabilistic classifier, and wherein during the control stage, the extrapolated curves are submitted to the probabilistic classifier to estimate a touch impact point.

8. The multi-input call panel of claim 1, wherein the sensor comprises one or more of a thermal sensor, a motion sensor, a Light Detection and Ranging (LIDAR) sensor, and a camera.

9. The multi-input call panel of claim 1, wherein the probabilistic classifier corresponds to a Naive Bayes classifier, a k-Nearest Neighbor (KNN) classifier, a Gaussian Mixture Model (GMM) classifier, a Support Vector Machine (SVM) classifier, and a classifier based on Parzen Kernel Density Estimates.

10. A method for controlling an operation of an elevator system using a multi-input call panel, comprising:

receiving, via a touchless interface of the multi-input call panel, readings of a sensor of the touchless interface arranged to sense motion in proximity to a touchable interface of the multi-input call panel, wherein the touchable interface is distinct from the touchless interface;

executing, by a processor and in response to receiving the readings, a probabilistic classifier trained to output a probability of correspondence of the received readings with an intention to touch one or multiple touchable inputs from a plurality of touchable inputs arranged at different locations on a touchable interface of the multi-input call panel; and controlling, by a controller of the elevator system, the operation of the elevator system according to a control command associated with a touchable input of the plurality of touchable inputs when at least the touchable input is touched on the touchable interface or the probabilistic classifier outputs the probability of the intention to touch the touchable input above a probability threshold.

11. The method of claim 10, further comprising:

changing, via a switcher of the multi-input call panel, modes of operation of the multi-input call panel, wherein the modes of operation include a training mode and a control mode, wherein the modes of operation include a training mode and a control mode, wherein during the training mode, a plurality of touch inputs of the touchable inputs and the readings of the sensor preceding the plurality of touch inputs are collected and used to train the probabilistic classifier, and wherein during the control mode, the plurality of touch inputs and the probability output by the probabilistic classifier are used to control the operation of the elevator system.

12. The method of claim 11, further comprising:

storing a pretrained probabilistic classifier and training readings of the sensor that are associated with respective touchable inputs and used for the training of the probabilistic classifier in a memory of the touchless interface, wherein during the training mode, the readings of the sensor are mapped to the training readings associated with the same touchable input to produce a transformation function, and wherein during the control mode, the readings of the sensor are transformed by the transformation function and submitted to the probabilistic classifier.

13. The method of claim 11, further comprising:

storing a training program for training the probabilistic classifier, wherein during the training mode, the readings of the sensor leading to touching a corresponding touchable input are labeled with the corresponding touchable input, wherein the training program, upon receiving multiple pairs of readings and the corresponding touchable inputs, trains the probabilistic classifier.

14. The method of claim 11, further comprising:

arranging the sensor to sense a plane parallel to the multi-input call panel and located at a fixed distance from the multi-input call panel, wherein the processor determines, from readings of the sensor, a location at which a tip of a user's finger crosses the plane.

15. The method of claim 14, further comprising:

arranging the sensor to sense a set of planes parallel to the multi-input call panel and located at different distances from the multi-input call panel, wherein the processor determines, from readings of the sensor, a location at which a tip of the user's finger crosses each of the planes.

16. The method of claim 15, further comprising:

extrapolating the locations where the tip of the user's finger crosses each of the planes to produce an extrapolated curve ending at the corresponding touchable input, wherein, during the training mode, the extrapolated curves ending at the corresponding touchable inputs are used for the training of the probabilistic classifier, and wherein during the control stage, the extrapolated curves are submitted to the probabilistic classifier to estimate a touch impact point.

17. An apparatus corresponding to a multi-input call panel for controlling an operation of an elevator system, comprising:

a touchable interface associated with a plurality of touchable inputs arranged at different locations on the multi-input call panel; and a touchless interface including a processor operatively connected to receive readings of a sensor arranged to sense motion in proximity to the touchable interface and configured to, in response to receiving the readings, execute a probabilistic classifier trained to output a probability of correspondence of the received readings with an intention to touch one or multiple touchable inputs from the plurality of touchable inputs; and a controller configured to control the operation of the elevator system according to a control command associated with a touchable input of the plurality of touchable inputs when at least the touchable input is touched on the touchable interface or the probabilistic classifier outputs the probability of the intention to touch the touchable input above a probability threshold.

18. The apparatus of claim 17, further comprising:

a switcher configured to change modes of operation of the multi-input call panel, wherein the modes of operation include a training mode and a control mode, wherein during the training mode, a plurality of touch inputs of the touchable inputs and the readings of the sensor preceding the plurality of touch inputs are collected and used to train the probabilistic classifier, and wherein during the control mode, the plurality of touch inputs and the probability output by the probabilistic classifier are used to control the operation of the elevator system.

19. The apparatus of claim 18, wherein the processor is coupled with a memory configured to store a pretrained probabilistic classifier, and training readings of the sensor that are associated with respective touchable inputs, wherein during the training mode, the readings of the sensor are mapped to the training reading associated with the same touchable input to produce a transformation function, and wherein during the control mode, the readings of the sensor are transformed by the transformation function and submitted to the probabilistic classifier.

20. The apparatus of claim 18, wherein the processor is coupled with a memory configured to store a training program for training the probabilistic classifier, wherein during the training mode, the readings of the sensor leading to touching a corresponding touchable input are labeled with the corresponding touchable input, wherein the training program, upon receiving multiple pairs of readings and the corresponding touchable inputs, trains the probabilistic classifier.

* * * * *